US012705883B2

(12) United States Patent
Le Borgne et al.

(10) Patent No.: US 12,705,883 B2
(45) Date of Patent: Aug. 11, 2026

(54) METHOD FOR DETERMINING AREAS OF LAND DISTINCT FROM PREDETERMINED OBSTACLES AND COMPATIBLE WITH THE INSTALLATION OF PHOTOVOLTAIC PANELS

(71) Applicant: TotalEnergies SE, Courbevoie (FR)

(72) Inventors: Emmanuel Le Borgne, Courbevoie (FR); Gilles Poulain, Antony (FR); Théo Vanneuville, Croissy-sur-Seine (FR); David Benhaiem, Viroflay (FR)

(73) Assignee: TotalEnergies SE, Courbevoie (FR)

( * ) Notice: Subject to any disclaimer, the term of this patent is extended or adjusted under 35 U.S.C. 154(b) by 346 days.

(21) Appl. No.: 18/286,000

(22) PCT Filed: Apr. 8, 2022

(86) PCT No.: PCT/EP2022/059401
§ 371 (c)(1),
(2) Date: Oct. 6, 2023

(87) PCT Pub. No.: WO2022/214648
PCT Pub. Date: Oct. 13, 2022

(65) Prior Publication Data

US 2024/0242497 A1 Jul. 18, 2024

(30) Foreign Application Priority Data

Apr. 9, 2021 (FR) ..................................... 21 03631

(51) Int. Cl.
*G06V 20/10* (2022.01)
*G06V 10/20* (2022.01)
*G06V 20/13* (2022.01)

(52) U.S. Cl.
CPC .......... *G06V 20/176* (2022.01); *G06V 10/255* (2022.01); *G06V 20/13* (2022.01);
(Continued)

(58) Field of Classification Search
CPC .... G06V 20/176; G06V 10/255; G06V 10/25; G06V 20/13; G06V 20/17; G06V 10/74;
(Continued)

(56) References Cited

U.S. PATENT DOCUMENTS 10,366,287 B1 7/2019 Loveland et al.
10,754,999 B1 * 8/2020 Vratimos ................ G06F 30/13
(Continued)

FOREIGN PATENT DOCUMENTS

JP 2013186719 A 9/2013
JP 2015132881 A * 7/2015
WO 2019143102 A1 7/2019

OTHER PUBLICATIONS

Biofuelwatch. "Biomass and Land Use", Mar. 16, 2018. URL for article list that shows publication date: <URL: https://www.biofuelwatch.org.uk/2018/page/4/>. URL for article: <URL: https://www.biofuelwatch.org.uk/2018/biomass-and-land-use/>. (Year: 2018).*
(Continued)

*Primary Examiner* — Matthew C Bella
*Assistant Examiner* — Nicholas John Helco
(74) *Attorney, Agent, or Firm* — Troutman Pepper Locke LLP

(57) ABSTRACT

The present invention relates to a method for determining zones of a territory, called candidate zones, distinct from predetermined obstacles and compatible with the installation of photovoltaic panels, the method comprising the following steps:

detecting images predetermined obstacles in an image of a territory seen from the sky, meshing the image in elementary portions, converting the mesh into a matrix, called main matrix, by assigning a first number to each elementary portion wherein an obstacle is located and a second number to the other portions, (Continued)

identifying the largest sub-matrix, called raw sub-matrix, comprising only second numbers and satisfying a compatibility criterion for the installation of photovoltaic panels, and determining a candidate zone compatible with the installation of photovoltaic panels according to the determined raw sub-matrix.

12 Claims, 5 Drawing Sheets

(52) U.S. Cl.
CPC ............... *G06T 2207/10032* (2013.01); *G06T 2207/20021* (2013.01); *G06V 2201/10* (2022.01)

(58) Field of Classification Search
CPC .... G06V 10/82; G06V 2201/10; G06V 10/40; G06V 10/50; G06V 10/70; Y02A 30/60; G06T 2207/10032; G06T 2207/30181; G06T 2207/30184; G06T 3/02; G06T 3/60; G06T 2207/20021; G06T 2207/20084; G06T 7/60; G06T 7/62
See application file for complete search history.

(56) References Cited

U.S. PATENT DOCUMENTS

| | | | | |
|---|---|---|---|---|
| 2009/0177458 | A1* | 7/2009 | Hochart | G06T 17/05 707/999.01 |
| 2009/0304227 | A1* | 12/2009 | Kennedy | G06V 20/13 702/155 |
| 2011/0205245 | A1 | 8/2011 | Kennedy et al. | |
| 2014/0261636 | A1* | 9/2014 | Anderson | H02S 10/40 136/251 |
| 2015/0016730 | A1* | 1/2015 | Miller | G06Q 30/0201 382/195 |
| 2015/0066442 | A1* | 3/2015 | Pryor | G06Q 10/04 136/251 |
| 2017/0091578 | A1 | 3/2017 | Ananthakrishnan et al. | |
| 2017/0352192 | A1 | 12/2017 | Petrovskaya et al. | |
| 2021/0117677 | A1* | 4/2021 | Loveland | G01J 1/44 |
| 2024/0289972 | A1* | 8/2024 | Cassagne | G06T 7/507 |

OTHER PUBLICATIONS

Lee, Stephen et al. "DeepRoof: A Data-driven Approach For Solar Potential Estimation Using Rooftop Imagery", Jul. 25, 2019, KDD 2019, pp. 2105-2113. Retrieved from ACM Digital Library: <DOI: https://doi.org/10.1145/3292500.3330741>. (Year: 2019).*

Rapport De Recherche Internationale issued in International Patent Application No. PCT/EP2022/059401 dated Jul. 4, 2022.

Rapport De Recherche Préliminaire issued in French Patent Application No. 2103631 dated Dec. 15, 2021.

Lee S., et al. "DeepRoof: A Data-driven Approach For Solar Potential Estimation Using Rooftop Imagery" Applied Data Science Track Paper, 9gs. 2105-2113 (2019).

Odeh Saad et al: "Assessment Method to Identify the Potential of Rooftop PV Systems in the Residential Districts", Energies, vol. 14, No. 14, Jul. 14, 2021 (Jul. 14, 2021), p. 4240, XP055873307, DOI: 10.3390/en14144240.

Communication pursuant to Article 94(3) EPC (Notification selon l'Article 94 (3) CBE) dated Jan. 28, 2026, from corresponding European Application No. 22721372.5.

Notice of Reasons for Refusal with English translation dated Jan. 27, 2026, from corresponding Japanese Application No. 2023-561602.

* cited by examiner

METHOD FOR DETERMINING AREAS OF LAND DISTINCT FROM PREDETERMINED OBSTACLES AND COMPATIBLE WITH THE INSTALLATION OF PHOTOVOLTAIC PANELS

CROSS REFERENCE TO RELATED APPLICATIONS

The present application is a U.S. National Phase Application under 35 U.S.C. § 371 of International Patent Application No. PCT/EP2022/059401 filed Apr. 8, 2022, which claims priority of French Patent Application No. 21 03631 filed Apr. 9, 2021. The entire contents of which are hereby incorporated by reference.

FIELD OF THE INVENTION

The present invention relates to a method for determining zones of a territory, distinct from predetermined obstacles, and compatible with the installation of photovoltaic panels. The invention further relates to an associated computer program with such method.

BACKGROUND

The production of electricity from renewable energies is a challenge for our societies. To this end, dedicated installations have been developed, including photovoltaic panels which are used for producing electricity from solar energy. Photovoltaic panels are conventionally installed on the roofs of buildings, for maximizing the energy recovered.

The large-scale deployment of photovoltaic panels requires the identification of other zones of a territory, compatible with the installation of such panels. However, the identification of such zones on mappings is not easy.

There is thus a need for a tool for helping an operator to identify zones of a territory which are compatible with the installation of photovoltaic panels.

SUMMARY

To this end, the subject matter of the present description is a method for determining zones of a territory, called candidate zones, distinct from predetermined obstacles and compatible with the installation of photovoltaic panels, the method being implemented by computer and comprising the following steps:

a. the reception of at least one image of a territory seen from the sky,
b. detection of images of predetermined obstacles on the image,
c. meshing the image into elementary portions,
d. converting the mesh into a matrix, called main matrix, by assigning a first number to each elementary portion wherein an obstacle is located and a second number to the other elementary portions, the second number being distinct from the first number,
e. identifying the largest sub-matrix, called raw sub-matrix, comprising only second numbers and satisfying at least one compatibility criterion for the installation of photovoltaic panels, and
f. determining a candidate zone compatible with the installation of photovoltaic panels according to the determined raw sub-matrix.

According to other particular embodiments, the method comprises one or more of the following features, taken individually or according to all technically possible combinations:

- at least one compatibility criterion stipulates that the shape of the raw sub-matrix is predetermined so as to be compatible with the shape of photovoltaic panels, the predetermined shape being preferentially rectangular;
- the at least one compatibility criterion stipulates that the zone of the territory corresponding to the raw sub-matrix is greater than or equal to a threshold surface area, the threshold surface area being chosen so as to be compatible with the dimensions of photovoltaic panels, the threshold surface area being preferentially greater than or equal to one hectare;
- the step of determining a candidate zone comprises:
  a. the rotation of the raw sub-matrix with a predetermined step,
  b. the determination, if any, of a position of the raw sub-matrix for which the raw sub-matrix is surrounded exclusively by second numbers, and
  c. obtaining an intermediate sub-matrix, the intermediate sub-matrix being either the raw sub-matrix or a sub-matrix comprising only the second numbers of the raw sub-matrix at the determined position and second numbers surrounding the raw sub-matrix at the determined position, the candidate zone being determined depending on the intermediate sub-matrix;
- the step of determining a candidate zone comprises:
  a. the meshing of the space surrounding the intermediate sub-matrix into elementary sub-portions, the elementary sub-portions having dimensions strictly smaller than the elementary portions, a first number being assigned to each elementary sub-portion wherein an obstacle is located and a second number being assigned to the other elementary sub-portions,
  b. obtaining a final sub-matrix, the final sub-matrix being either the intermediate sub-matrix or a sub-matrix comprising only the second numbers of the intermediate sub-matrix and, where appropriate, second numbers surrounding the intermediate sub-matrix when the intermediate sub-matrix is surrounded exclusively by second numbers, the candidate zone being the zone of the territory corresponding to the final sub-matrix;
- after the step of determining a candidate zone, the method comprises a step of assigning first numbers to the elementary portions of the main matrix corresponding to the determined candidate zone, and repeating the steps of identifying and determining a candidate zone until a raw sub-matrix is identified;
- the detection of obstacles on the image is implemented by at least one detection model, trained beforehand on a database comprising images of obstacles seen from the sky;
- the obstacles comprise at least one of the following: buildings, roads, outdoor parking lots, railway tracks, power lines and bodies of water;
- the method comprises a step of determining the irradiance of at least one determined candidate zone.

The present description further relates to a computer program product comprising program instructions stored on a computer-readable storage medium, for the execution of a method as described above when the computer program is executed on a computer.

The present description further relates to a readable information medium on which a computer program product such as described hereinabove is stored.

BRIEF DESCRIPTION OF THE DRAWINGS

Other features and advantages of the invention will appear upon reading hereinafter the description of the embodiments of the invention, given only as an example, and making reference to the following drawings.

DETAILED DESCRIPTION

Figure 1:
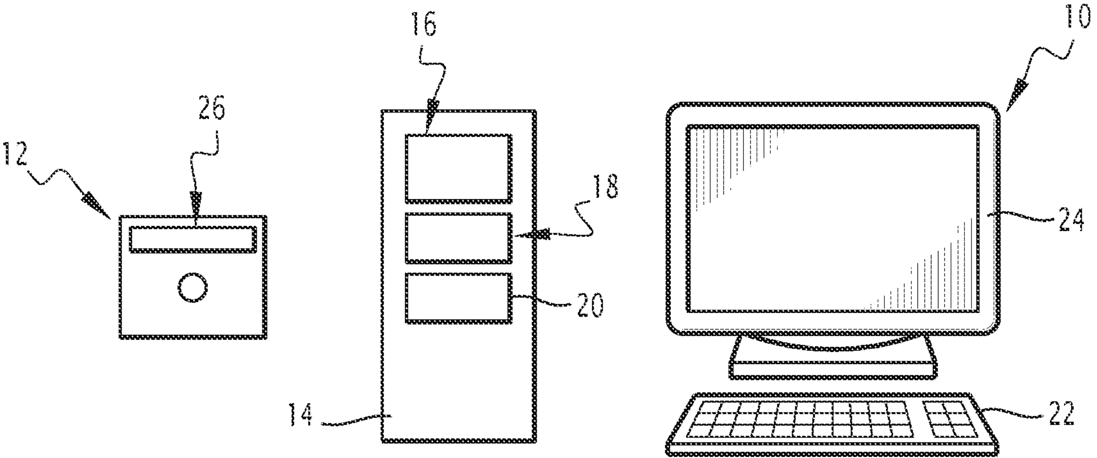
FIG. 1, a schematic view of an example of a computer used for the implementation of a method for determining zones of a territory, distinct from predetermined obstacles and compatible with the installation of photovoltaic panels.

A calculator 10 and a computer program product 12 are shown in FIG. 1.

The calculator 10 is preferentially a computer.

More generally, the calculator 10 is an electronic calculator suitable for manipulating and/or transforming data represented as electronic or physical quantities in registers of the calculator 10 and/or memories into other similar data corresponding to physical data in memories, registers or other types of display, transmission or storage.

The calculator 10 interacts with the computer program product 12.

As shown in FIG. 1, the calculator 10 includes a processor 14 comprising a data processing unit 16, memories 18 and a data storage medium 20. In the example illustrated in FIG. 1, the calculator 10 comprises a keyboard 22 and a display unit 24.

The computer program product 12 includes a storage medium 26.

The storage medium 26 is a medium readable by the calculator 10, usually by the data processing unit 16. The readable storage medium 26 is a medium suitable for storing electronic instructions and apt to be coupled to a bus of a computer system.

As an example, the storage medium 26 is a diskette or a floppy disk, an optical disk, a CD-ROM, a magneto-optical disk, a ROM, a RAM, an EPROM, an EEPROM, a magnetic card or an optical card.

The computer program 12 containing program instructions is stored on the storage medium 26.

The computer program 12 can be loaded into the data processing unit 16 and is suitable for leading to the implementation of a method for determining zones of a territory, distinct from obstacles O and compatible with the installation of photovoltaic panels, when the computer program 12 is implemented on the processing unit 16 of the calculator 10.

Figure 2:
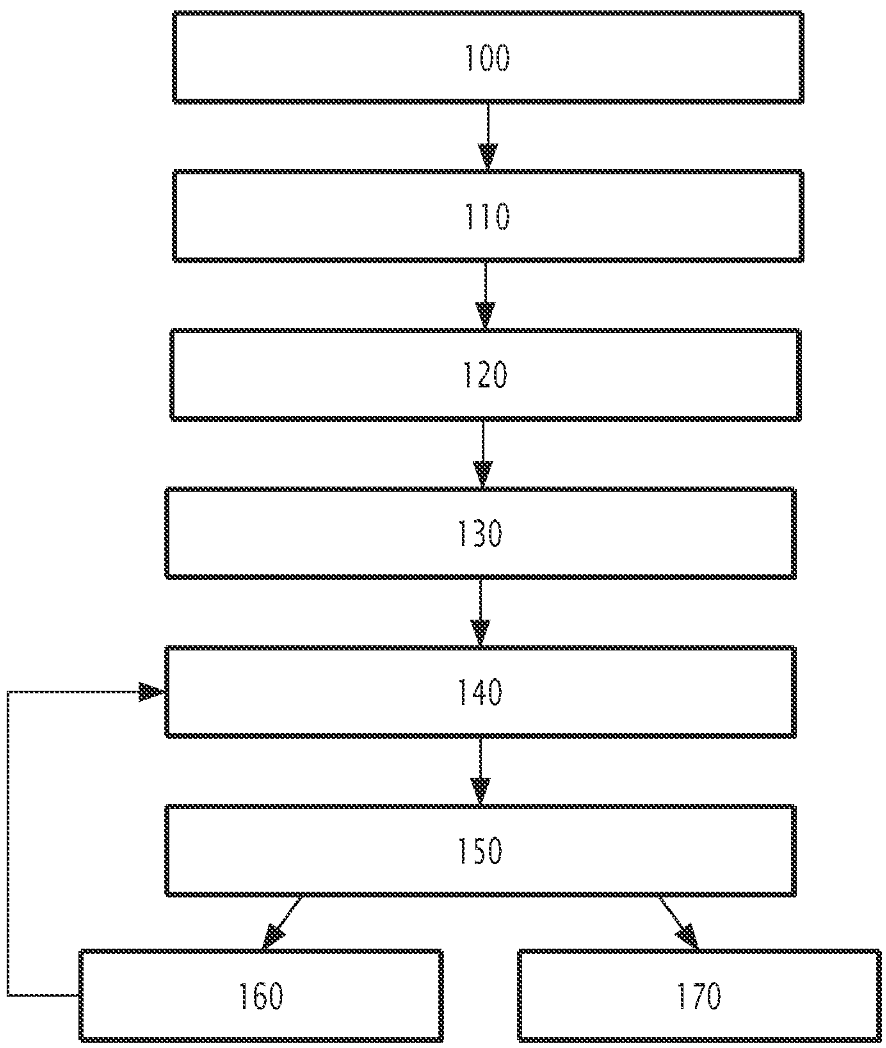
FIG. 2, a flowchart of an example of implementation of a method for determining zones of a territory, distinct from predetermined obstacles and compatible with the installation of photovoltaic panels, FIG. 3, a schematic representation of an example of a zone of a territory corresponding to a raw sub-matrix, FIG. 4, a schematic representation of an example of a zone of a territory corresponding to an intermediate sub-matrix obtained following the rotation of the raw sub-matrix, and FIG. 5, a schematic representation of an example of a zone of a territory corresponding to a final sub-matrix obtained following the meshing of the space surrounding the intermediate sub-matrix into elementary sub-portions.

The operation of the calculator 10 will now be described with reference to FIG. 2, which schematically illustrates an example of the implementation of a method for determining zones of a territory, distinct from predetermined obstacles O, and compatible with the installation of photovoltaic panels (solar panels), and to FIGS. 3 to 5 which illustrate examples of zones of the territory corresponding to different matrices obtained during the implementation of the method.

The determination method aims to determine zones of a territory, called candidate zones $Z_C$, distinct from predetermined obstacles O, and compatible with the installation of photovoltaic panels. In other words, each candidate zone $Z_C$ typically has dimensions and a shape making possible the installation of one or a plurality of photovoltaic panels on the zone.

Preferentially, the candidate zones $Z_C$ are zones of the territory corresponding to free spaces because same do not have predetermined obstacles O. A free space is e.g. a zone without any constructions. A forest or field are examples of free spaces.

Preferentially, the candidate zones $Z_C$ are zones of the open-air territory, i.e. receiving direct solar radiation. Typically, the candidate zones $Z_C$ are a plurality meters long and a plurality of meters wide.

The predetermined obstacles O are e.g. at least among: buildings, roads, outdoor parking lots, railway tracks, power lines and bodies of water. An outdoor parking lot is defined as a zone intended for parking vehicles. An outdoor parking lot optionally comprises a marking on the ground delimiting the parking spaces of the vehicles. More generally, the predetermined obstacles O are typically constructions or bodies of water.

The determination method comprises a step 100 of reception of at least one image of a territory seen from the sky. The territory is a space wherein it is desired to install photovoltaic panels. The territory comprises e.g. urban elements and vegetation.

The term "seen from the sky" means that the image IM was taken from a high point of view making it possible e.g. to image the roofs of buildings.

For example, the image IM was acquired by a satellite system. In a variant, the image IM was acquired by an acquisition system (camera) mounted on an aircraft.

Preferentially, the image IM is a two-dimensional image. Advantageously, the image IM is a color image.

The step 100 is implemented by the calculator 10 in interaction with the computer program product 12, i.e. is implemented by computer.

The determination method comprises a step 110 of detection of images of predetermined obstacles O on the image IM. The step 110 is implemented by the calculator 10 in interaction with the computer program product 12, i.e. is implemented by computer.

In an example of implementation, the image IM is associated with geographical coordinates and the computer has access to a database of obstacles O, each associated with a geographical coordinate, which makes it possible to identify obstacles O on the image IM. The database was e.g. obtained collaboratively via users indicating the presence of an obstacle O (building, road, outdoor parking, railway track, power line, body of water).

In addition or as a variant, the detection of obstacles O on the image IM is implemented by at least one detection model, trained beforehand on a database comprising images of obstacles seen from the sky O. For example, such a model has been trained for detecting a predefined type of obstacle O for which there is insufficient collaborative information. The detection model is e.g. a neural network.

The determination method comprises a step 120 of meshing the image IM into elementary portions. The step 120 is implemented by the calculator 10 in interaction with the computer program product 12, i.e. is implemented by computer.

In an example of implementation, the meshing is a grid applied to the IM image and the elementary portions are squares.

The determination method comprises a step 130 of converting the meshing into a matrix, called main matrix. The step 130 is implemented by the calculator 10 in interaction with the computer program product 12, i.e. is implemented by computer.

The main matrix is obtained by assigning a first number (e.g. 0) to each elementary portion wherein there is an obstacle O and by assigning a second number (e.g. 1) to the other elementary portions, the second number being distinct from the first number.

The determination method comprises a step 140 of identifying, in the main matrix, the largest sub-matrix, called raw sub-matrix, comprising only second numbers and satisfying at least one compatibility criterion for the installation of photovoltaic panels. The step 140 is implemented by the calculator 10 in interaction with the computer program product 12, i.e. is implemented by computer.

For example, one or a plurality of the following compatibility criteria are taken into account during the identification step 140.

Advantageously, the at least one compatibility criterion stipulates that the shape of the raw sub-matrix is predetermined so as to be compatible with the shape of photovoltaic panels. The installation of photovoltaic panels is thereby facilitated. Since the photovoltaic panels generally have a rectangular shape, the predetermined shape is preferentially rectangular.

Advantageously, the at least one compatibility criterion stipulates that the zone of the territory corresponding to the raw sub-matrix is greater than or equal to a threshold surface area. The threshold surface area is chosen so as to be compatible with the dimensions of photovoltaic panels. The threshold surface area is preferentially greater than or equal to one hectare.

Advantageously, the at least one compatibility criterion stipulates that the zone of the territory corresponding to the raw sub-matrix has a slope the value of which lies within a range of predetermined values and/or has a slope the orientation of which, corresponding to the direction of pointing of the normal to the slope, (e.g. expressed in azimuth) is within a range of predetermined values. The slope and orientation values are e.g. obtained by means of a numerical terrain model of the territory under consideration.

For example, the main matrix is:

$$M = \begin{matrix} 0 & 1 & 1 & 0 \\ 1 & 1 & 1 & 1 \\ 1 & 1 & 1 & 1 \\ 1 & 1 & 0 & 0 \end{matrix}.$$

The identification step 140 aims to identify the largest rectangular sub-matrix formed by 1, the number 0 being assigned to the elementary portions comprising an obstacle O.

For the first row: the widest rectangle with only 1s extends from (1,2) to (1,3) (an (m,n) notation, m being the number of the row of the matrix, and n being the number of the column of the matrix). Thereby, a maximum surface area corresponding to 2 elementary portions is obtained.

For the second line: the widest rectangle with only 1s extends from (1,2) to (2,3). Thereby, a maximum surface area corresponding to 4 elementary portions is obtained.

For the third line: the widest rectangle with only 1s extends from (2,1) to (3,4). Thereby, a maximum surface area corresponding to 8 elementary portions is obtained.

For the fourth line: the widest rectangle with only 1s extends from (2,1) to (4,2). The maximum surface area thus remains of 8 elementary portions.

Thereby, in the present example, the raw sub-matrix comprises only the rows 2 and 3 of the main matrix.

Figure 3:
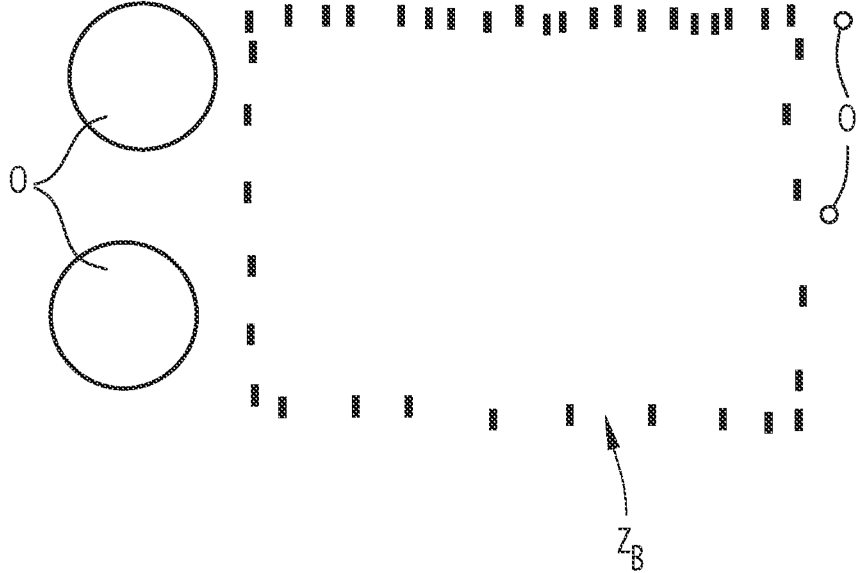

The example shown in FIG. 3 illustrates a zone of the territory, called raw zone $Z_B$, corresponding to a raw sub-matrix. As can be seen in the FIG. 3, the obstacles O are situated outside the raw zone $Z_B$.

The determination method comprises a step 150 of determining a candidate zone compatible with the installation of photovoltaic panels according to the determined raw sub-matrix. The step 150 is implemented by the calculator 10 in interaction with the computer program product 12, i.e. is implemented by computer.

In a first example of implementation, the candidate zone is the zone of the territory corresponding to the raw sub-matrix.

In a second example of implementation, the determination step 150 comprises the rotation (on itself) of the raw sub-matrix with a predetermined step, and the possible determination of a position of the raw sub-matrix for which the raw sub-matrix is surrounded exclusively by second numbers. "Surrounded exclusively" means that only elementary portions corresponding to second numbers are adjacent to the elementary portions assigned to the raw sub-matrix. The rotation aims at determining if it is possible to enlarge the raw sub-matrix by rotating same. The predetermined step is e.g. 5° and the rotation is e.g. carried out between 0° and 180°.

At the end of the rotation, an intermediate sub-matrix is obtained. The intermediate sub-matrix is either the raw sub-matrix, or a sub-matrix comprising only the second numbers of the raw sub-matrix at the determined position, as well as second numbers surrounding the raw sub-matrix at the determined position, provided that the at least one compatibility criterion is satisfied (in particular a criterion relating to the shape of the intermediate sub-matrix e.g. the intermediate sub-matrix keeps a rectangular shape). The second numbers added to the raw sub-matrix correspond in particular to elementary portions adjacent to the raw sub-matrix.

The candidate zone is determined based on the intermediate sub-matrix. For example, the candidate zone is a zone of the territory corresponding to the intermediate sub-matrix or a zone of the territory corresponding to a final sub-matrix as will be described hereinafter.

Figure 4:
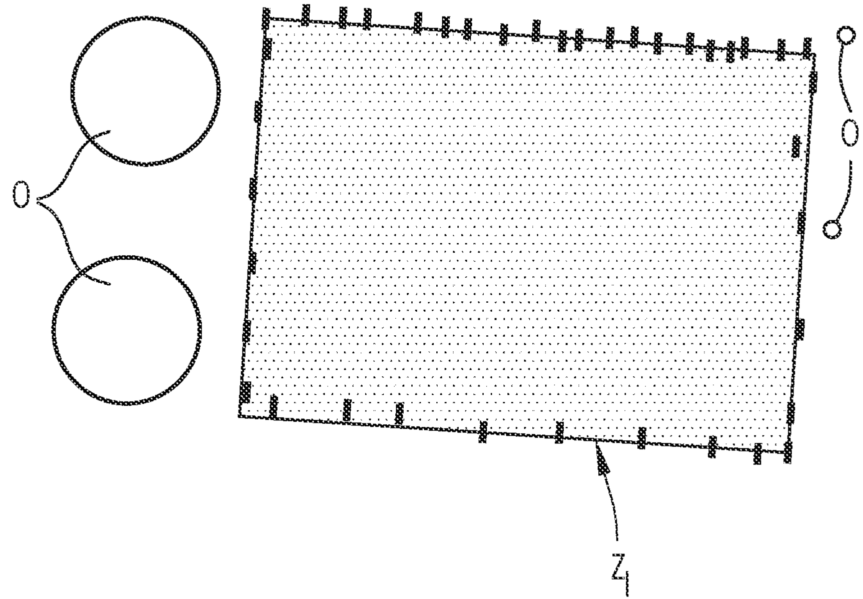

FIG. 4 illustrates an example of a zone of the territory, called intermediate zone, corresponding to a rotation of the raw sub-matrix with respect to FIG. 3. As can be seen in the FIG. 4, the obstacles O are situated outside this intermediate zone $Z_I$.

As an optional complement to the second example, the determination step 150 comprises the meshing into elementary sub-portions, of the space surrounding the intermediate sub-matrix. The meshing is e.g. a grid applied to the image IM and the elementary sub-portions are squares.

A first number is then assigned to each elementary sub-portion wherein an obstacle O is located and a second number is assigned to the other elementary sub-portions.

A final sub-matrix is then obtained. The final sub-matrix is either the intermediate sub-matrix, or a sub-matrix comprising only the second numbers of the intermediate sub-matrix and when the intermediate sub-matrix is surrounded exclusively by second numbers, also some of said second numbers, provided that at least one compatibility criterion is satisfied (in particular a criterion relating to the shape of the final sub-matrix e.g. the final sub-matrix keeps a rectangle shape). The second numbers added to the intermediate sub-matrix correspond in particular to elementary sub-portions adjacent to the intermediate sub-matrix. The candidate zone is the zone of the territory corresponding to the final sub-matrix.

Figure 5:
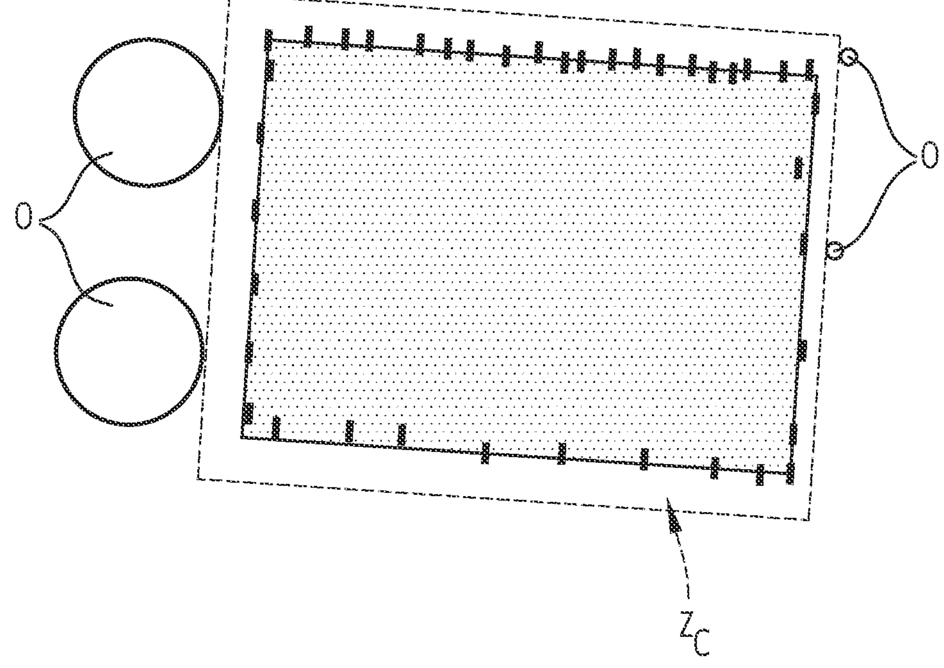

FIG. 5 illustrates an example of a zone of the territory, called candidate zone $Z_C$, obtained by widening the intermediate zone shown in FIG. 4 following the application of a fine meshing on the zone of the space surrounding the intermediate zone. As can be seen in the FIG. 5, the obstacles O are located outside the candidate zone $Z_C$.

In a variant, the final sub-matrix is obtained directly from the raw sub-matrix and not from the intermediate sub-matrix (no rotation step of the raw sub-matrix).

Preferentially, the determination method comprises a step 160 of assigning first numbers to the elementary portions of the main matrix corresponding to the determined candidate zone. The determined candidate zone for the identification of other candidate zones $Z_C$ of the territory can thereby be masked. The step 160 is implemented by the calculator 10 in interaction with the computer program product 12, i.e. is implemented by computer.

The steps of identifying and determining a candidate zone are then repeated as long as a raw sub-matrix is identified (satisfying at least one compatibility criterion).

Optionally, the determination method comprises a step 170 of determining the irradiance of at least one determined candidate zone $Z_C$. The step 170 is e.g. implemented by the calculator 10 in interaction with the computer program product 12, i.e. is implemented by computer.

Irradiance, expressed in watts per square meter ($W/m^2$), is the incident radiant flux (power) received by a surface per unit of surface area. The irradiance is e.g. determined by means of an irradiance mapping of the territory under consideration.

Optionally, the determination method comprises the manufacture of photovoltaic panels and/or the installation of photovoltaic panels on candidate zones $Z_C$ of the environment.

Thereby, the present method can be used for determining zones of an environment, compatible with the installation of solar panels, the zones being different from predetermined obstacles O and thereby corresponding to free spaces.

A person skilled in the art will understand that the embodiments and variants described above can be combined so as to form new embodiments provided that same are technically compatible.

The invention claimed is:

1. A method for determining zones of a territory, called candidate zones, distinct from predetermined obstacles and compatible with the installation of photovoltaic panels, the method being implemented by computer and comprising the following steps:

receiving at least one image of a territory seen from the sky, detecting predetermined obstacles imaged on the image, meshing the image into elementary portions, converting the mesh into a matrix, called main matrix, by assigning a first number to each elementary portion wherein an obstacle is located and a second number to the other elementary portions, the second number being distinct from the first number, identifying the largest sub-matrix, called raw sub-matrix, comprising only second numbers and satisfying at least one compatibility criterion for the installation of photovoltaic panels, and determining a candidate zone compatible with the installation of photovoltaic panels according to the determined raw sub-matrix, wherein the step of determining a candidate zone comprises:

rotating the raw sub-matrix with a predetermined step, determining if any, of a position of the raw sub-matrix for which the raw sub-matrix is surrounded exclusively by second numbers, and obtaining an intermediate sub-matrix, the intermediate sub-matrix being either the raw sub-matrix or a sub-matrix comprising only the second numbers of the raw sub-matrix at the determined position and second numbers surrounding the raw sub-matrix at the determined position, the candidate zone being determined according to the intermediate sub-matrix.

2. The method according to claim 1, wherein the at least one compatibility criterion states that the shape of the raw sub-matrix is predetermined so as to be compatible with the shape of photovoltaic panels.

3. The method according to claim 1, wherein the at least one compatibility criterion stipulates that the zone of the territory corresponding to the raw sub-matrix is greater than or equal to a threshold surface area, the threshold surface area being chosen so as to be compatible with the dimensions of photovoltaic panels.

4. The method according to claim 1, wherein the step of determining a candidate zone comprises:

meshing of the space surrounding the intermediate sub-matrix into elementary sub-portions, the elementary sub-portions having dimensions strictly smaller than the elementary portions, a first number being assigned to each elementary sub-portion wherein an obstacle is located and a second number being assigned to the other elementary sub-portions, and obtaining a final sub-matrix, the final sub-matrix being either the intermediate sub-matrix or a sub-matrix comprising only the second numbers of the intermediate sub-matrix and, where appropriate, second numbers surrounding the intermediate sub-matrix when the intermediate sub-matrix is surrounded exclusively by second numbers, the candidate zone being the zone of the territory corresponding to the final sub-matrix.

5. The method according to claim 1, wherein after the step of determining a candidate zone, the method comprises a step of assigning first numbers to the elementary portions of the main matrix corresponding to the determined candidate zone, and the repetition of the steps of identifying and determining a candidate zone as long as a raw sub-matrix is identified.

6. The method according to claim 1, wherein the detecting of obstacles on the image is implemented by at least one detection model, trained beforehand on a database comprising images of obstacles seen from the sky.

7. The method according to claim 1, wherein the obstacles comprise at least one of the following elements: buildings, roads, outdoor parking lots, railway tracks, power lines and bodies of water.

8. The method according to claim 1, wherein the method comprises a step of determining the irradiance of at least one determined candidate zone.

9. The method according to claim 2, wherein the predetermined shape is rectangular.

10. The method according to claim 3, wherein the threshold surface area is greater than or equal to one hectare.

11. A non-transitory readable information medium on which a computer program product according to claim 1 is stored.

12. A method for determining zones of a territory, called candidate zones, distinct from predetermined obstacles and compatible with the installation of photovoltaic panels, the method being implemented by computer and comprising the following steps:

receiving at least one image of a territory seen from the sky, detecting predetermined obstacles imaged on the image, meshing the image into elementary portions, converting the mesh into a matrix, called main matrix, by assigning a first number to each elementary portion wherein an obstacle is located and a second number to the other elementary portions, the second number being distinct from the first number, identifying the largest sub-matrix, called raw sub-matrix, comprising only second numbers and satisfying at least one compatibility criterion for the installation of photovoltaic panels, and determining a candidate zone compatible with the installation of photovoltaic panels according to the determined raw sub-matrix, wherein the step of determining a candidate zone comprises:

meshing of the space surrounding an intermediate sub-matrix into elementary sub-portions, the elementary sub-portions having dimensions strictly smaller than the elementary portions, a first number being assigned to each elementary sub-portion wherein an obstacle is located and a second number being assigned to the other elementary sub-portions, and obtaining a final sub-matrix, the final sub-matrix being either the intermediate sub-matrix or a sub-matrix comprising only the second numbers of the intermediate sub-matrix and, where appropriate, second numbers surrounding the intermediate sub-matrix when the intermediate sub-matrix is surrounded exclusively by second numbers, the candidate zone being the zone of the territory corresponding to the final sub-matrix.

* * * * *